United States Patent
Murayama et al.

(10) Patent No.: US 6,667,416 B2
(45) Date of Patent: Dec. 23, 2003

(54) METHOD AND APPARATUS FOR PRODUCING POLYESTER POLYOL, POLYESTER POLYOL AND POLYURETHANE FOAM

(75) Inventors: Kouichi Murayama, Osaka (JP); Katsumi Inaoka, Osaka (JP); Takashi Kumaki, Osaka (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 233 days.

(21) Appl. No.: 09/912,312

(22) Filed: Jul. 26, 2001

(65) Prior Publication Data

US 2002/0035166 A1 Mar. 21, 2002

(30) Foreign Application Priority Data

Jul. 31, 2000 (JP) ........................................ 2000-230534

(51) Int. Cl.[7] .............................................. C07C 67/48
(52) U.S. Cl. ..................... 560/79; 521/172; 521/173; 521/174; 528/83; 528/84; 528/85
(58) Field of Search ................................ 521/172, 173, 521/174; 528/83, 84, 85; 560/79

(56) References Cited

U.S. PATENT DOCUMENTS

| | | | |
|---|---|---|---|
| 4,469,824 A | 9/1984 | Grigsby, Jr. et al. | 521/173 |
| 5,360,900 A | 11/1994 | DeLeon et al. | 536/18.3 |

FOREIGN PATENT DOCUMENTS

| | | |
|---|---|---|
| EP | 0 112 013 | 6/1984 |
| JP | 2000-17058 | 1/2000 |

OTHER PUBLICATIONS

Patent Abstracts of Japan, vol. 2000, No. 10, Nov. 17, 2000 & JP 2000–191756 A, Jul. 11, 2000 *abstract*.

Patent Abstracts of Japan, vol. 014, No. 137, Mar. 15, 1990 & JP 02–011625 A, Jan. 16, 1990 *abstract*.

*Primary Examiner*—John M. Cooney, Jr.
(74) *Attorney, Agent, or Firm*—Wenderoth, Lind & Ponack, L.L.P.

(57) ABSTRACT

To provide a method for producing polyester polyol that can provide a simple process to produce extensively improved production efficiencies and also produce the polyester polyol of stable in quality, an apparatus for producing the polyester polyol produced by the method, a polyester polyol produced by the method, and a polyurethane foam obtained by use of the polyester polyol produced by the method, polyethylene terephthalate and raw polyol are allowed to react in a reaction vessel to produce polyester polyol and also ethylene glycol which is a by-product of the reaction is distilled off and the distillate is modified in a modifying vessel so that it can have a predetermined hydroxyl value and then is fed to the reaction vessel again as the raw glycol, to thereby produce the polyester polyol.

6 Claims, 2 Drawing Sheets

METHOD AND APPARATUS FOR PRODUCING POLYESTER POLYOL, POLYESTER POLYOL AND POLYURETHANE FOAM

BACKGROUND OF THE INVENTION

1. Field of the Invention

The present invention relates to a method for producing polyester polyol, to an apparatus for producing polyester polyol by means of the producing method, to a polyester polyol produced by the producing method, and to a polyurethane foam obtained by use of the polyester polyol thus produced.

2. Description of the Background Art

It is known that polyester polyols in which an aromatic compound is introduced as a polyol component of the raw material of rigid polyurethane foam can be used to improve the flame retardance of the rigid polyurethane foam.

These polyester polyols can be obtained by reaction of e.g. short-chain glycol, such as ethylene glycol and diethylene glycol, and dibasic acid, such as phthalic acid. When terephtalic acid is used as the dibasic acid, the flame retardance of the rigid polyurethane foam can be improved to a large extent. Due to this, the polyester polyols in which the terephtalic acid is introduced are widely used as the polyol component of the raw material of the rigid polyurethane foam.

However, the polyester polyols using terephtalic acid as the raw material of the rigid polyurethane foam are significantly high in crystallinity, and as such may cause defects, such as reduction in mutual solubility with other components and reduction in workability, in the process of producing the rigid polyurethane foam.

Meanwhile, recovery polyethylene terephthalates, such as recovery PET bottles and recovery PET films, has been recycled increasingly in various fields in the recent years. In this connection, for example, Japanese Laid-open (Unexamined) Patent Publication No. Sho 60-130620 describes a process of producing polyester polyol, according to which reusable polyethylene terephthalate is allowed to react with diethylene glycol and at least one of the other oxyalkylene glycols and then sufficient ethylene glycol is stripped therefrom, to thereby produce the polyester polyol having the property of being not solidified or separated even when it is allowed to stand and thus being useful for the production of rigid polyurethane foam.

However, the process disclosed by the Japanese Laid-open (Unexamined) Patent Publication No. Sho 60-130620 has the following disadvantages. Although the sufficient ethylene glycol is stripped, since the stripped ethylene glycol is subjected to post-treatment as it is, efficient use of the raw material is not provided, and it is difficult to achieve extensive improvement of the production efficiency. Also, since the stripped ethylene glycol is subjected to post-treatment as it is, the process is complicated and the facility therefor is required. Further, although the polyester polyol obtained keeps its normal quality during the originally intended period from the production, some fine difference in prescription for preparation of the diethylene glycol and the at least one of the other oxyalkylene glycols used as the raw material could cause the polyester polyol to vary with age and consequently the polyester polyol may produce white turbidity, increase in viscosity or be crystallized.

It is an object of the present invention to provide a method for producing polyester polyol that can provide a simple process to produce extensively improved production efficiencies and also produce the polyester polyol of stable in quality. It is another object of the present invention to provide an apparatus for producing the polyester polyol produced by the method of the present invention. It is still another object of the present invention to provide the polyester polyol produced by the method of the present invention. It is a further object of the present invention to provide polyurethane foam obtained by use of the polyester polyol produced by the method of the present invention.

SUMMARY OF THE INVENTION

The present invention provides a novel method for producing polyester polyol by reaction of polyethylene terephthalate and raw polyol, wherein ethylene glycol which is a by-product of the reaction of polyethylene terephthalate and raw polyol is modified and the modified ethylene glycol is used as the raw polyol.

In this method, it is preferable that the ethylene glycol of the by-product is modified with alkylene oxide. Additionally, low-molecular-weight polyol may be used as the raw polyol, together with the modified ethylene glycol. It is preferable that a hydroxyl value of the raw polyol is in the range of 400–1,000 mgKOH/g.

Also, the present invention provides a novel apparatus for producing polyester polyol, which comprises a reaction vessel for allowing polyethylene terephthalate and raw polyol to react; a modifying vessel for modifying ethylene glycol distilled off from the reaction vessel; and a supply line for supplying the ethylene glycol modified in the modifying vessel to the reaction vessel as the raw polyol.

The present invention covers polyester polyol produced by reaction of polyethylene terephthalate and raw polyol, wherein the raw polyol comprises a modified ethylene glycol which is obtained by modifying ethylene glycol which is a by-product of the reaction of polyethylene terephthalate and raw polyol.

Further, the present invention covers polyurethane foam obtained by reaction of a polyol component comprising polyester polyol and a polyisocyanate component, wherein the polyester polyol is obtained by reaction of polyethylene terephthalate and raw polyol, and wherein the raw polyol comprises a modified ethylene glycol which is obtained by modifying ethylene glycol which is a by-product of the reaction of polyethylene terephthalate and raw polyol.

The method for producing polyester polyol of the present invention can provide the result of recycling the recovery polyethylene terephthalate effectively. Further, since the raw polyether is also reused from the distillate, wastes can be reduced by making good use of the raw polyol, thus providing an environmentally friendly result. Furthermore, the method of the present invention can provide the simple process requiring no post-treatment process of the distillate, so that the production efficiency can be improved to a large extent.

Thus, since the apparatus for producing polyester polyol of the present invention requires no facility for the post-treatment of the distillate, the apparatus is simple as a whole for the recycling facility. Besides, since there is provided the facility for modifying the distillate, efficient use of the raw polyol can be achieved.

With the polyester polyol of the present invention, quality variation with age is hardly caused and the good quality is always ensured.

As a result of this, the polyurethane foam of the present invention produced by use of the polyester polyol of the present invention can provide the fine cells, and can provide enhanced heat insulating efficiency.

DETAILED DESCRIPTION OF THE PREFERRED EMBODIMENTS

In the method for producing polyester polyol of the present invention, the polyester polyol is produced by reaction of polyethylene terephthalate and raw polyol.

Polyethylene terephthalates that may be used in the present invention include, for example, virgin polyethylene terephthalate and recovery polyethylene terephthalate after use. It is preferable, however, to use the recovery polyethylene terephthalate from the point of view of recycling. The recovery polyethylene terephthalates of various forms, such as recovery PET bottles, recovery PET films or waste PET materials from factories, can be used without limiting to any particular forms. For practical use, the recovery polyethylene terephthalates of cut, fractured or pulverized forms are preferable.

The raw polyols used in the present invention include at least modified ethylene glycol obtained by modifying ethylene glycol which is a by-product of the reaction of the raw polyol and the polyethylene terephthalate.

Figure 1:
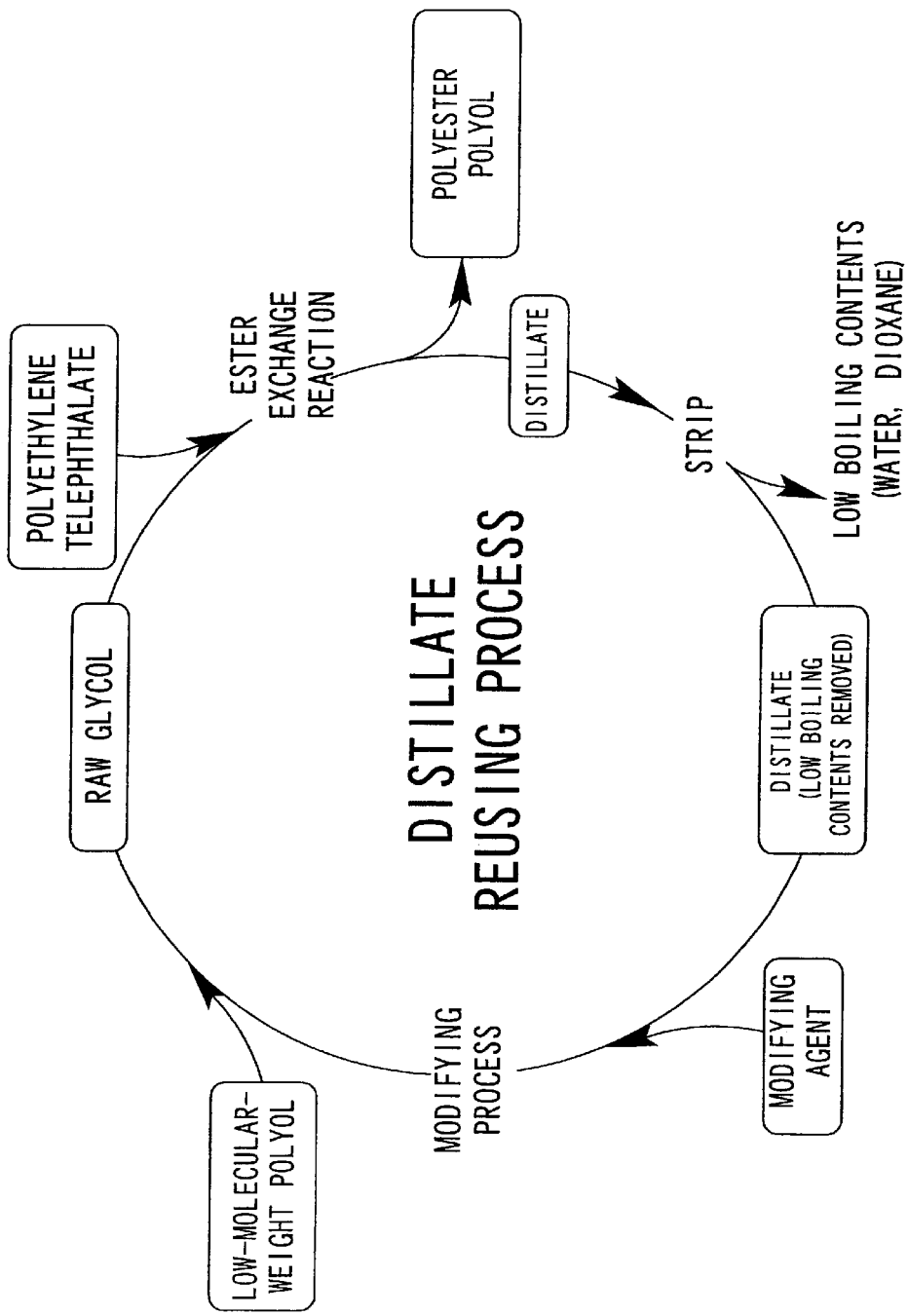
FIG. 1 is a conceptual diagram illustrating the recycling process of distillate in the method for producing polyester polyol of the present invention.

Accordingly, the raw polyol of the present invention is reused as the raw glycol in a process as shown in FIG. 1 wherein the distillate containing ethylene glycol, which is a by-product of the reaction of the raw polyol and the polyethylene terephthalate, is stripped, and then the ethylene glycol contained in the distillate is modified.

To be specific, in the reaction of the raw polyol and the polyethylene terephthalate, an oxyethylene group in the polyethylene terephthalate is exchanged for the raw polyol by the ester exchange reaction and thereby ethylene glycol is distillated. In practice, the distillate resulting from the reaction contains low boiling contents such as water, dioxane and methanol in addition to ethylene glycol and ethylene glycol derivatives such as diethylene glycol. Accordingly, the low boiling contents are stripped in advance, for example, at 90–180° C., or preferably at 100–150° C. Under temperature of lower than 90° C., the low boiling contents cannot be removed effectively, while, under temperature of higher than 180° C., ethylene glycol may be distilled off. In the strip process, a nitrogen bubbling may be performed to remove the low boiling contents further effectively.

The striping process should preferably be performed to provide the ethylene glycol, which is contained in the range of 40–90 weight %, or preferably 50–80 weight % in the distillate after the low boiling contents are removed therefrom, having: the average polymerization degree n in the range of 1.50–1.05, or preferably 1.40–1.09, and the hydroxyl value in the range of 1,300–1,750 mgKOH/g, or preferably 1,400–1,700 mgKOH/g.

Then, the distillate from which the low boiling contents were removed is subjected to a modification process. In the modification process of the distillate, ethylene glycol is modified by adding modifying agent thereto, so that when the ethylene glycol is reused as the raw glycol, it can have the property of inhibiting the crystallization of the polyester polyol obtained. The modification processes that may be used include, for example, an alkylene oxide modification process in which alkylene oxide used as the modifying agent is added to ethylene glycol, to produce the alkylene-oxide adducts of the ethylene glycol, and an epoxy modification process in which glycidyl ether used as the modifying agent is added to ethylene glycol, to allow it to react with the ethylene glycol. Preferably, the alkylene oxide modification process is used in that it can provide the simple and stable modification process.

To be more specific, the alkylene oxide modification process can be performed in the manner that for example ethylene oxide, propylene oxide and butylene oxide used as the alkylene oxide are continuously fed to the distillate in the presence of a known alkali catalyst at a reaction temperature of 90–130° C. and a reaction pressure of 0.05–1.00 MPa. Preferably, the ethylene oxide and/or the propylene oxide are continuously fed to the distillate.

It is preferable that the ethylene glycol modified by this modification process is made to have a hydroxyl value in the range of 300–800 mgKOH/g, or preferably 400–700 mgKOH/g.

The distillate containing the modified ethylene glycol thus obtained is used as the raw polyol. To allow the ethylene glycol to be fit to use as the raw polyol, low-molecular-weight polyol is preferably mixed with that distillate to adjust the hydroxyl value.

The low-molecular-weight polyols that may be mixed include low-molecular-weight polyols except ethylene glycol. For example, glycols, such as diethylene glycol, triethylene glycol, tetraethylene glycol, polyethylene glycol, propylene glycol, dipropylene glycol, tripropylene glycol, polypropylene glycol, 1,4-butanediol, 1,3-butanediol, 2,3-butanediol, 1,5-pentanediol, and 1,6-hexanediol, and polyfunctional polyols of at least trifunctional polyol, such as glycerin, trimethylolpropane, diglycerin, pentaerythritol and methyl glucoside, can be cited as the low-molecular-weight polyols to be mixed. Of these low-molecular-weight polyols, diethylene glycol is preferably used. The use of polyfunctional polyol can provide an increased strength of the rigid polyurethane foam obtained by use of the polyester polyol obtained.

It is preferable that the raw polyol in which this additional low-molecular-weight polyol is adequately mixed as needed is made to have a hydroxyl value in the range of 400–1,000 mgKOH/g, or preferably 500–900 mgKOH/g. With the hydroxyl value of higher than that, there remains ethylene glycol and diethylene glycol so much that the crystallization of polyester polyol cannot be inhibited. On the other hand, with the hydroxyl value of lower than that, the proportion of high-molecular-weight polyol becomes high, so that the flame retardance of the polyurethane foam produced by use of the polyester polyol obtained may deteriorate, and further a quantity of alkylene oxide to be fed may increase, causing an economical disadvantage The low-molecular-weight polyol may be mixed in or with the distillate as was subjected to the modification process, as shown in FIG. 1. Alternatively, the low-molecular-weight polyol may be premixed in the distillate before being subjected to the modification process, first, and then subjected to the modification process together with that distillate, though not shown in FIG. 1.

Then, the raw polyol obtained is allowed to react with the polyethylene terephthalate again by the ester exchange reaction as mentioned above. For example, this reaction can be performed continuously in an atmosphere of nitrogen at a reaction temperature of 180–250° C., so that the proportion of the raw polyol to the polyethylene terephthalate is in the range of 90–200 parts by weight, or preferably 100–150 parts by weight, of raw polyol per 100 parts by weight of polyethylene terephthalate. For example, acetates or carbonates of lead, zinc, manganese, calcium, cobalt and cadmium, oxides of lead, zinc and antimony, and known esterifying catalysts, such as organic titanium compound, Lewis acid, sulfuric acid and hydrochloric acid, are preferably used for the reaction as a catalyst.

It is preferable that the polyester polyol obtained by the reaction has a hydroxyl value in the range of 100–500 mgKOH/g, and more preferably 200–400 mgKOH/g. With the hydroxyl value of higher than that, unreacted raw polyol in the polyester polyol increases, so that for example the substantial property of the polyurethane foam obtained by use of the polyester polyol obtained may not be provided. On the other hand, with the hydroxyl value of lower than that, the viscosity increases, so that for example workability and moldability in the process of producing the polyurethane foam by use of the polyester polyol obtained may be lowered.

Thus, the method for producing polyester polyol of the present invention can provide the result of recycling the recovery polyethylene terephthalate effectively. Further, since the raw polyol is also reused from the distillate, wastes can be reduced by making good use of the raw polyol, thus providing an environmentally friendly result. Furthermore, the method of the present invention can provide the simple process requiring no post-treatment process of the distillate, so that the production efficiency can be improved to a large extent.

According to this producing method of the present invention, since the distillate is modified for reuse repeatedly, quality of the raw polyol can be kept unchanged and stable supply of the raw polyol can be achieved. This can provide the result of producing the polyester polyol of stable in quality. With the conventional polyester polyol, although the polyester polyol keeps its normal quality during the originally intended period from the production, some fine difference in quality of the raw polyol could cause the polyester polyol to vary with age to produce white turbidity, increased viscosity or crystallization. In contrast to this, with the polyester polyol obtained by the method of the present invention, such quality variation with age is hardly caused and the good quality is kept unchanged for a long term.

Figure 2:
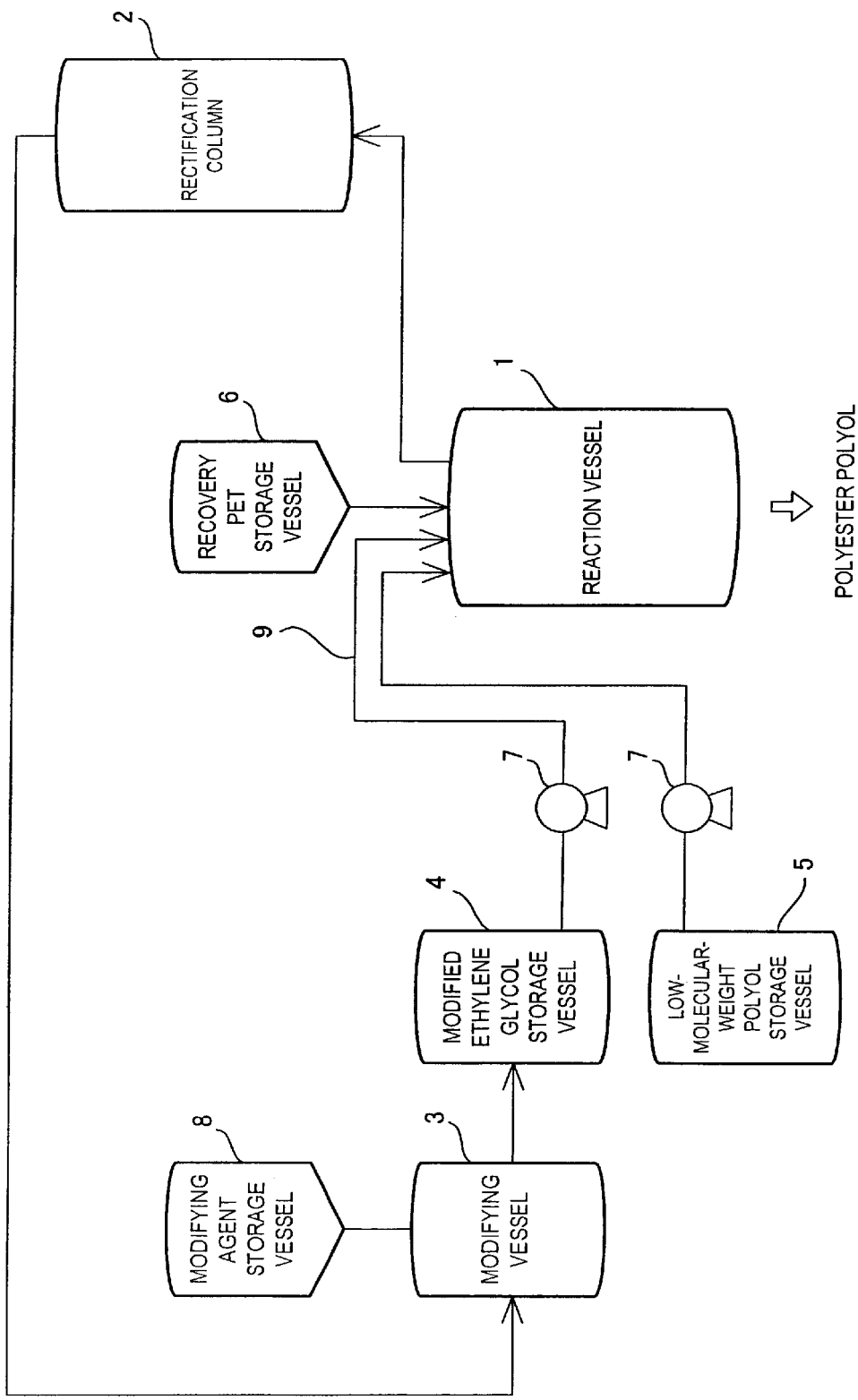
FIG. 2 is a schematic block diagram of an embodiment of an apparatus for producing the polyester polyol of the present invention.

Now, referring to FIG. 2 which is a schematic block diagram of an embodiment of an apparatus for producing the polyester polyol by use of the producing method of the present invention, description on the apparatus for producing the polyester polyol will be given. In FIG. 2, the apparatus includes a reaction vessel 1, a rectification column 2, a modifying vessel 3, a modified ethylene glycol storage vessel 4, a low-molecular-weight polyol storage vessel 5 and a recovery PET (polyethylene glycol) storage vessel 6. At locations downstream from the reaction vessel 1, the rectification column 2, the modifying vessel 3, and the modified ethylene glycol storage vessel 4 are sequentially connected with the reaction vessel 1 via a connection line such as a piping and the like. Further, at a location downstream from the modified ethylene glycol storage vessel 4, the reaction vessel 1 is connected with the modified ethylene glycol storage vessel 4 via a supply line 9 such as piping and the like. Thus, the reaction vessel 1, the rectification column 2, the modifying vessel 3, and the modified ethylene glycol storage vessel 4 are connected in the form of a closed line. The low-molecular-weight polyol storage vessel 5 and the recovery PET storage vessel 6 are connected with the reaction vessel 1 independently via their respective connection lines such as piping and the like. The modified ethylene glycol is stored in the modified ethylene glycol storage vessel 4. The low-molecular-weight polyol is stored in the low-molecular-weight polyol storage vessel 5. The pulverized recovery polyethylene terephthalate is stored in the recovery PET storage vessel 6.

In operation, the modified ethylene glycol from the modified ethylene glycol storage vessel 4, the low-molecular-weight polyol from the low-molecular-weight polyol storage vessel 5 and the recovery polyethylene terephthalate from the recovery PET storage vessel 6 are sequentially supplied to the reaction vessel 1 in the above-mentioned proportions respectively, so that the polyester polyol is synthesized in the reaction vessel 1 by the ester exchange reaction mentioned above. The polyester polyol obtained is taken out from the reaction vessel 1, and the distillate containing the ethylene glycol which is a by-product of the reaction process is fed to the rectification column 2. Sequentially, after the low boiling contents are removed from the distillate in the rectification column 2, the distillate from which the low boiling contents were removed is fed to the modifying vessel 3 and is modified therein so that it can have a predetermined hydroxyl value as mentioned above. The modifying vessel 3 comprises, for example, an epoxy synthesizing device and an alkylene oxide adding/synthesizing device, as mentioned above. Glycidyl ethers (in the case of epoxy modification) or alkylene oxides (in the case of alkylene oxide modification) are stored as the modifying agent in a modifying agent storage vessel 8 connected to the modifying vessel and are properly fed to the modifying vessel 3 from the modifying agent storage vessel 8. Then, the distillate containing the modified ethylene glycol is returned to the modified ethylene glycol storage vessel 4 and then is fed again therefrom to the reaction vessel 1 via the supply line 9 by means of a pump 7.

When the polyester polyol is produced by this polyester polyol producing apparatus, the distillated ethylene glycol is modified to be reused as the raw polyol, so that there is no need to provide the facility for subjecting the distillate to the post-treatment. On the other hand, although the facility for modifying the distillate is needed, since the efficient use of the raw polyol is provided by that facility, wastes can be reduced on a environmentally-friendly basis. Besides, since the process is simplified, improvement of the production efficiency can be achieved to a large extent.

The polyester polyol of the present invention thus produced can be applied to polyurethane resins, and rigid, semi-rigid and flexible polyurethane foams without any limitation. Particularly, the polyester polyol of the present invention can be effectively used as a polyol component of the raw material of the rigid polyurethane foam. When the rigid polyurethane foam is produced, the polyester polyol of the present invention has good mutual solubility with other components well, and can provide improved workability and also can provide improved flame retardance of the rigid polyurethane foam obtained. Further, when the polyester polyol of the present invention is used as a polyol component of the raw material of the rigid polyurethane foam, there can be provided fine cells to enhance the heat insulating efficiency of the rigid polyurethane foam.

Polyester polyol is generally poor in mutual solubility with cyclopentane or CFCs substitutes such as HFC-245fa and HFC-365mfc. In the present invention, however, the ethylene glycol as the by-product was modified with alkylene oxide and the like and this modified ethylene glycol is used as the raw material for producing the polyester polyol. Accordingly, the polyester polyol of the present invention is good enough in mutual solubility with cyclopentane or CFCs substitutes to be mixed at a high ratio. Hence, the use of the polyester polyol of the present invention can provide an increased heat insulating efficiency for the rigid polyurethane foam obtained.

Now, reference will be given to the method of producing e.g. rigid polyurethane foam as an embodiment of polyurethane foam of the present invention.

The rigid polyurethane foam can be formed in any known conventional way without limiting to any particular way. For example, a polyol component including the polyester polyol of the present invention and a polyisocyanate component may be foamed in the presence of a reactive catalyst, a blowing agent and a foam stabilizer, and an addition agent, if necessary.

With the polyester polyol of the present invention as an essential polyol component, a polyol component commonly used as the raw material of the rigid polyurethane foam may be mixed with it, depending on an intended purpose or application.

The polyol components that may be used include, for example, polyether polyol and polyester polyol. The polyether polyol can be obtained, for example, by a low-molecular-weight polyol and/or a low-molecular-weight polyamine having 2–8 active hydrogen groups and being used as an initiator to subject ethylene oxide and/or propylene oxide to ring-opening addition polymerization with the initiator. The polyether polyol having the hydroxyl value of the order of 300–700 mgKOH/g is preferably used.

The polyester polyol can be obtained, for example, by dibasic acid, such as adipic acid, phthalic acid, isophthalic acid, terephthalic acid and maleic acid, or anhydrides thereof, being polymerized with glycol or triol, such as ethylene glycol, diethylene glycol, triethylene glycol, propylene glycol, dipropylene glycol, 1,4-butanediol, glycerin, and trimethylolpropane. The polyester polyol having the hydroxyl value of the order of 200–450 mgKOH/g is preferably used. Alternatively, phenol resins having a reactive methylol group may be used as the polyol component. The polyol components (homogeneousness or heterogeneousness) can be used singly or in combination.

The polyester polyol of the present invention is preferably mixed with the other polyether polyol, depending on an intended purpose or application. In this case, a quantity of polyester polyol mixed is preferably in the range of e.g. 5–90 parts by weight, or preferably 10–70 parts by weight, of polyester polyol per 100 parts by weight of polyol component.

As for the polyisocyanate component, it can be used without any particular limitation, as long as it is commonly used as the raw material of the rigid polyurethane foam. Polymethylene polyphenyl polyisocyanate (Polymeric MDI; Crude MDI) is generally used. Also, e.g. tolylene diisocyanate (TDI), crude TDI, diphenylmethane diisocyanate (MDI), and their modified polyols, modified trimmers, modified carbodiimides, modified biurets, modified allophanates and modified uretdions may be used. These polyisocyanate components (homogeneousness or heterogeneousness) can be used singly or in combination. The quantity of polyisocyanate components used is in the range of e.g. 1.0–3.0 equivalents (NCO/OH) of isocyanate group of the polyisoyanate component to the hydroxyl group of the polyol component.

As for the reactive catalyst, it can be used without any particular limitation, as long as it is commonly used as the catalyst of the rigid polyurethane foam. Those that may be used as the reactive catalyst include, for example, tertiary amines, such as dimethylhexylamine, dimethylcyclohexylamine, pentamethyldiethylenetriamine, dimethylethanolamine, tetramethylethylenediamine, tetramethylhexamethylenediamine, triethylenediamine and tetramethylpropanediamine, and their carboxylates or quaternary ammonium salts, and organic metallic compounds such as dibutyltin dilaurate, lead octylate, potassium acetate and potassium octylate. These catalysts can be used singly or in combination. The quantity of catalyst used is in the order of e.g. 0.01–20 parts by weight per 100 parts by weight of polyol component.

As for the blowing agent, it can be used without any particular limitation, as long as it is commonly used as the blowing agent of the rigid polyurethane foam. For example, flon (chlorofluorocarbon) compounds (CFCs substitute) such as HCFC-141b, HFC-134a, HFC-245fa, and HFC-365mfc, and low-boiling-point hydrocarbon compounds such as cyclopentane, n-pentane, iso-pentane, and n-butane are used. These blowing agents can be used singly or in combination. The quantity of blowing agent used is in the order of e.g. 5–50 parts by weight per 100 parts by weight of polyol component.

Additionally, water may be used in combination with these blowing agents. The use of water can provide improvements in flowability, strength, heat resistance and dimensional stability under low temperature of the foam. Specifically, when water is used in combination, carbon dioxide is produced by reaction of water and the isocyanate group and, simultaneously, urea bond is produced by the reaction. The urea bond can produce increased polar groups to provide enhanced strength and heat resistance of the foam bone structure. In addition, the urea bond can also permit the produced carbon dioxide to present in the form of gas in the cells even under refrigerating temperature as low as −30° C., so that the pressure in the cell is held, thus providing improvement in dimensional stability under low temperature of the foam. When water is used in combination, 0.1–2.5 parts by weight of blowing agent per 100 parts by weight of polyol is preferably used for the rigid polyurethane foam of a normal degree of about 25–50 kg/m$^3$, thought it depends on the density and heat insulating efficiency of the final product.

As for the foam stabilizer, it can be used without any particular limitation, as long as it is commonly used as the foam stabilizer of the rigid polyurethane foam. For example, the so-called silicon surface active agents having polydimethylsiloxane and polyoxyalkylene chains are used. The quantity of the foam stabilizer used is in the order of e.g. 0.2–10 parts by weight per 100 parts by weight of the polyol component.

As for the other adding agents, for example, a viscosity adjusting agent such as propylene carbonate, an oxidation inhibitor and a flame retardant are suitably used for the intended purpose and application for the purposes of adjusting the viscosity and the mixing ratio between premix and polyisocyanate component, of providing anti-scorch at the foam molding and of providing flame retardance for the foam.

The rigid polyurethane foam may be produced by any known foaming method without any particular limitation. Specifically, it may be produced, for example, by the process that after all components except the polyisocyanate component, i.e., the polyol component, the reactive catalyst, the blowing agent and the foam stabilizer, and additionally the adding agent, if necessary, are premixed to prepare a premix, the premix and the polyisocyanate component are mixed by means of a foaming gear and the like and then the mixture is injected into a specific mold for the foaming.

Thus, the polyurethane foam of the present invention produced by use of the polyester polyol of the present invention can provide the fine cells, and can provide enhanced heat insulating efficiency.

EXAMPLES

In the following, the present invention is described further concretely with reference to the examples, but is not limited to any of the examples. It should be noted that the terms "parts" and "%" used herein are on the basis of weight, unless otherwise specified.

Example 1

Production of Distillate:

500 g of PET bottle flake IFN-10 (available from ARK Co., Ltd.) and 465 g of diethylene glycol were added into a 1,000 ml four-necked flask to which an agitator, a thermometer, a nitrogen in-lead tube and a rectification column were connected and were allowed to react by agitation, while nitrogen was injected therein at 220–240° C. in the presence of 200 ppm of titanium tetrabutoxide. The PET bottle flake started to be dissolved from around 220° C. The by-product of ethylene glycol was distilled off with nitrogen, and after 20 hours, the reaction was stopped by cooling. The distillate obtained was 150 g. The distillate had the composition comprising 6% of water, 70% of ethylene glycol, 22% of diethylene glycol, and 2% of dioxane. After the low boiling contents were forcibly stripped from the distillate with nitrogen at 130° C. for 30 minutes, the distillate became 135 g and had the hydroxyl value of 1,500 mgKOH/g.

Modification Process:

127 g of ethylene oxide was continuously added to 100 g of the distillate thus obtained in the presence of 2.5 g of N-ethyl morpholine at 130° C. and 0.25 MPa, for the addition reaction. After the reaction, the hydroxyl value was measured. The hydroxyl value was 660 mgKOH/g.

Production of Polyester Polyol:

200 g of PET bottle flake IFN-10 (available from ARK Co., Ltd.), 130 g of the modified ethylene oxide solution mentioned above (hydroxyl value of 660 mgKOH/g), and 130 g of diethylene glycol were added into the 1,000 ml four-necked flask to which the agitator, the thermometer, the nitrogen in-lead tube and the rectification column were connected and were allowed to react by agitation, while nitrogen was injected therein at 220–240° C. in the presence of 200 ppm of titanium tetrabutoxide. The PET bottle flake started to be dissolved from around 220° C. The by-product of ethylene glycol was distilled off with nitrogen, and after 20 hours, the reaction was stopped by cooling. The distillate obtained was 60 g. The polyester polyol obtained was transparent brown liquid having the hydroxyl value of 250 mgKOH/g and the viscosity of 5,700 mPa·s/25° C. Any of white turbidity, increased viscosity and crystallization did not occur in the polyester polyol when stored for 3 months at room temperature.

Example 2

200 g of PET bottle flake IFN-10 (available from ARK Co., Ltd.), 140 g of the modified ethylene oxide solution obtained in the polyester polyol producing process of Example 1 (hydroxyl value of 660 mgKOH/g), and 140 g of diethylene glycol were added into the 1,000 ml four-necked flask to which the agitator, the thermometer, the nitrogen in-lead tube and the rectification column were connected and were allowed to react by agitation, while nitrogen was injected therein at 220–240° C. in the presence of 200 ppm of titanium tetrabutoxide. The PET bottle flake started to be dissolved from around 220° C. The by-product of ethylene glycol was distilled off with nitrogen, and after 20 hours, the reaction was stopped by cooling. The distillate obtained was 70 g. The polyester polyol obtained was transparent brown liquid having the hydroxyl value of 310 mgKOH/g and the viscosity of 1,800 mPa·s/25° C. Any of the white turbidity, the increased viscosity and the crystallization did not occur in the polyester polyol when stored for 3 months at room temperature.

Example 3

After 30 g of diethylene glycol was added to 100 g of distillate (hydroxyl value of 1,500 mgKOH/g) obtained in the distillate producing process of Example 1, 1.0 g of potassium hydroxide flake was dissolved therein at 130° C. and then 128 g of propylene oxide was continuously added for reaction therewith. After completion of the reaction, 5 g of water and 3.0 g of KYOWAAD 600 (ampholytic adsorbent available from Kyowa Chemical Industry Co., Ltd.) were added, in order to remove the added potassium hydroxide. After completion of the dehydration and filtration process, glycol mixture having the hydroxyl value of 700 mgKOH/g was obtained.

Then, 200 g of PET bottle flake IFN-10 (available from ARK Co., Ltd.) and 260 g of glycol mixture mentioned above were added into the 1,000 ml four-necked flask to which the agitator, the thermometer, the nitrogen in-lead tube and the rectification column were connected and were allowed to react by agitation, while nitrogen was injected therein at 220–240° C. in the presence of 200 ppm of titanium tetrabutoxide. The PET bottle flake started to be dissolved from around 220° C. The by-product of ethylene glycol was distilled off with nitrogen, and after 20 hours, the reaction was stopped by cooling. The distillate obtained was 60 g. The polyester polyol obtained was transparent brown liquid having the hydroxyl value of 248 mgKOH/g and the viscosity of 5,400 mPa·s/25° C. Any of the white turbidity, the increased viscosity and the crystallization did not occur in the polyester polyol when stored for 3 months at room temperature.

Mutual Solubility Test

Each of the blowing agents shown in TABLE 1 were added to 100 parts of polyester polyols obtained in Examples 1 and 3 and 100 parts of Actcol ES-40 (diethylene phthalate having the hydroxyl value of 260 mgKOH/g commercially available from Mitsui Takeda Chemicals, Inc.), for comparison of solubility of the respective blowing agents with respect to the polyester polyols. The results are shown in TABLE 1.

TABLE 1

| Polyester polyol | | Example 1 | Example 3 | Actcol ES-40 |
|---|---|---|---|---|
| cyclopentane | Dissolved part number | | 10 | |
| | Separated Part number | 5 | 20 | 5 |
| HFC-245fa | Dissolved part number | 30 | 150 | |
| | Separated Part number | 40 | 160 | 5 |

TABLE 1-continued

| Polyester polyol | | Example 1 | Example 3 | Actcol ES-40 |
|---|---|---|---|---|
| HFC-365mfc | Dissolved part number | 5 | 70 | |
| | Separated part number | 10 | 80 | 5 |

It is clearly seen from TABLE 1 that Examples 1 and 3 had improved solubility with respect to cyclopentane, HFC-245fa and HFC-365mfc, when compared with Actcol ES-40. It is particularly noted that the solubility of Example 3 wherein the polyester polyol was modified with polypropylene oxide was significantly improved.

Producing Examples 1–3 and Producing Comparative Example 1:

With the polyester polyol obtained in the respective Examples as the polyol component, the rigid polyurethane foams as prescribed in TABLE 2 were produced as Producing Examples 1–3. The rigid polyurethane foam in which none of the polyester polyols obtained in the respective Examples was mixed was produced as Comparative Example 1 in the same manner.

Specifically, as shown in TABLE 2, the polyol component, the reactive catalyst, the blowing agent, and the foam stabilizer were mixed in the proportion shown in TABLE 2 and were prepared to 25° C. Sequentially, the polyisocyanate component as prepared to 25° C. was added to the mixture by the part number shown in TABLE 2 and agitated up for 6 seconds. Thereafter, the mixture was injected into a wooden box (25 cm×25 cm×25 cm) to foam the rigid polyurethane foam.

TABLE 2

| Prescription | Producing Example 1 | Producing Example 2 | Producing Example 3 | Producing Compara. Ex. 1 |
|---|---|---|---|---|
| Actcol GR-36B | 90 | 90 | 90 | 100 |
| Polyester polyol of Example 1 | 10 | | | |
| Polyester polyol of Example 2 | | 10 | | |
| Polyester polyol of Example 3 | | | 10 | |
| DMCHA | 3.0 | 3.0 | 4.0 | 2.9 |
| PMDETA | 0.3 | 0.3 | 0.4 | 0.3 |
| $H_2O$ | 1.5 | 1.5 | 1.5 | 1.5 |
| CP | 16 | 16 | 16 | 18 |
| B-8462 | 2.0 | 2.0 | 2.0 | 2.0 |
| 4040MC (Index 110) | 128 | 129 | 128 | 132 |
| CT (sec) | 4 | 4 | 4 | 4 |
| GT (sec) | 30 | 29 | 32 | 31 |
| RT (sec) | 49 | 48 | 52 | 50 |
| Df (kg/m³) | 25.6 | 25.6 | 25.9 | 25.5 |
| Kf (W/mK) | 0.0181 | 0.0180 | 0.0182 | 0.0186 |

Actcol GR-36B: aromatic sucrose-based polyol having hydroxyl value of 420 mg KOH/g available from Mitsui Takeda Chemicals, Inc.
DMCHA: Dimethylcyclohexylamine
PMDETA: Pentamethyldiethylenetriamine
CP: cyclopentane
B-8462: Silicon foam stabilizer available from Goldshmidte AG
4040MC: Mixture of Crude TDI and Crude MDI available from Mitsui Takeda Chemicals, Inc.

Cream Time (CT), Gel Time (GT), Rise Time (RT), Density of foam (Df) and Thermal conductivity (Kf) of the rigid polyurethane foams obtained of Producing Examples 1–3 and Producing Comparative Example 1 are also shown in TABLE 2 given above. It will be understood from TABLE 2 that Producing Examples 1–3 are superior to Producing Comparative Example 1 in heat insulating efficiency (Kf).

Producing Examples 4–7 and Producing Comparative Examples 2 and 3:

With the polyester polyol obtained in the Examples 1 and 3 as the raw polyol, the rigid polyurethane foams using compositions shown in TABLE 3 were produced as Producing Examples 4–7. The rigid polyurethane foams in which Actcol ES-40 of a commercially available polyester polyol product was mixed were produced as Producing Comparative Examples 2 and 3 in the same manner.

Specifically, as shown in TABLE 3, the polyol component, the reactive catalyst, the blowing agent, and the foam stabilizer were mixed in the proportion shown in TABLE 3 given below and were prepared to 25° C. Sequentially, the isocyanate component as prepared to 25° C. was added to the mixture by the part number shown in TABLE 3 and agitated up for 6 seconds. Thereafter, the mixture was injected into the wooden box (25 cm×25 cm×25 cm) to foam the rigid polyurethane foam.

TABLE 3

| Prescription | Producing Example 4 | Producing Example 5 | Producing Compara. Ex. 2 | Producing Example 6 | Producing Example 7 | Producing Compara. Ex. 3 |
|---|---|---|---|---|---|---|
| Actcol IR-45 | 30 | 30 | 30 | 30 | 30 | 30 |
| Polyester polyol of Example 1 | 70 | | | 70 | | |
| Polyester polyol of Example 3 | | 70 | | | 70 | |
| Actcol ES-40 | | | 70 | | | 70 |
| TMHDA | 0.5 | 0.6 | 0.5 | 0.5 | 0.6 | 0.5 |
| K-13 | 3.0 | 3.6 | 3.0 | 3.0 | 3.6 | 3.0 |
| $H_2O$ | 1.5 | 1.5 | 1.5 | 1.5 | 1.5 | 1.5 |
| HFC-245fa | 35 | 35 | 35 | | | |
| HFC-365mfc | | | | 35 | 35 | 35 |
| SH-193 | 2.0 | 2.0 | 2.0 | 2.0 | 2.0 | 2.0 |
| Mutual Solubility | Good | Good | No good | Good | Good | No good |
| M-200 (Index 150) | 155 | 155 | 155 | 155 | 155 | 155 |
| CT (sec) | 7 | 9 | 7 | 18 | 20 | 19 |
| GT (sec) | 42 | 44 | 43 | 45 | 46 | 46 |

TABLE 3-continued

| Prescription | Producing Example 4 | Producing Example 5 | Producing Compara. Ex. 2 | Producing Example 6 | Producing Example 7 | Producing Compara. Ex. 3 |
|---|---|---|---|---|---|---|
| Df (kg/m$^3$) | 28.3 | 28.8 | 32.0 | 33.2 | 34.1 | 36.7 |
| Roughness of Cell | None | None | Observed | None | None | Observed |

Actcol IR-45: Ethylenediamine-based polyol having hydroxyl value of 510 mg KOH/g available from Mitsui Takeda Chemicals, Inc.
Actcol ES-40: Diethylene phthalate having hydroxyl value of 260 mg KOH/g available from Mitsui Takeda Chemicals, Inc.
TMHDA: Tetramethylhexamethylenediamine
K-13: Potassium octylate
SH-193: Silicon foam stabilizer available from Dow Corning Toray Silicone Co., Ltd.
M-200: Crude MDI available from Mitsui Takeda Chemicals, Inc.

Cream Time (CT), Gel Time (GT) and Density of foam (Df) of the rigid polyurethane foams obtained of Producing Examples 4–7 and Producing Comparative Examples 2 and 3 are also shown in TABLE 3 given above. It will be understood from TABLE 3 that Producing Examples 4 and 5 and Producing Examples 6 and 7 are superior in mutual solubility with HFC-245fa and HFC-365mfc to Producing Comparative Example 2 and Producing Comparative Example 3, respectively, so that little roughness of cell are observed in the rigid polyurethane foams (Producing Examples 4–7).

While the illustrative embodiments and examples of the present invention are provided in the above description, such is for illustrative purpose only and it is not to be construed restrictively. Modification and variation of the present invention that will be obvious to those skilled in the art is to be covered by the following claims.

What is claimed is:

1. A method for producing a polyester polyol, which comprises:
   (i) reacting a polyethylene terphthalate and a raw polyol, to produce the polyester polyol and ethlene glycol as a by-product,
   (ii) separating the polyester polyol and the ethylene glycol by distillation to obtain a distillate of the ethylene glycol,
   (iii) stripping the ethylene glycol distillate of low boiling compounds,
   (iv) modifying the stripped ethylene glycol, and
   (v) reusing the modified ethylene glycol as the raw polyol in step (i).

2. The method according to claim 1, wherein the modified ethylene glycol inhibits crystallization of the polyester polyol.

3. The method according to claim 1, wherein the stripped ethlene glycol is modified with an alkylene oxide.

4. The method according to claim 1, wherein the raw polyol in step (i) includes a low-molecular-weight polyol together with the modified ethylene glycol.

5. The method according to claim 1, wherein the raw polyol has a hydroxyl value in a range of 400–1,000 mgKOH/g.

6. A polyester polyol, which is producing by a method, which comprises the steps of:
   (i) reaction a polyethylene terephthalate and a raw polyol, to produce the polyester polyol and ethylene glycol as a by-product,
   (ii) separating the polyester polyol and the ethlene glycol by distillation to obtain a distillate of the ethylene glycol,
   (iii) stripping the ethylene glycol distillate of low boiling compounds,
   (iv) modifying the stripped ethylene glycol, and
   (v) reusing the modified ethylene glycol as the raw polyol in step (i).

* * * * *